Dec. 9, 1924.

1,518,985

F. W. KRETSCHMER

SEXTANT REST

Filed June 7, 1923

WITNESSES

INVENTOR
F. W. KRETSCHMER
BY
ATTORNEYS

Patented Dec. 9, 1924.

1,518,985

UNITED STATES PATENT OFFICE.

FELIX WALTER KRETSCHMER, OF BROOKLYN, NEW YORK.

SEXTANT REST.

Application filed June 7, 1923. Serial No. 643,997.

*To all whom it may concern:*

Be it known that I, FELIX W. KRETSCHMER, a citizen of the United States, and a resident of the city of New York, borough of Brooklyn, in the county of Kings and State of New York, have invented a new and Improved Sextant Rest, of which the following is a full, clear, and exact description.

This invention relates to sextant rests and has for an object to provide an improved construction wherein an accurate observation may be more easily taken.

Another object of the invention is to provide a sextant rest in which a freely rotatable member acts as a support, the same being arranged to engage the face of the observer during the time of taking the observation.

A further object, more specifically, is to provide a rotatable eyepiece for the top of the telescope of a sextant with the parts so arranged that the usual action of taking the observation may take place and at the same time a support provided which will permit the free swinging of the sextant on the axis of the telescope.

In the accompanying drawing—

Figure 2:
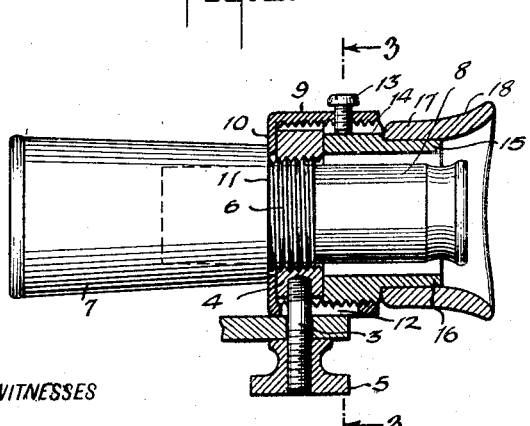
Figure 2 is a sectional view through Figure 1, approximately on line 2—2.
Figure 3:
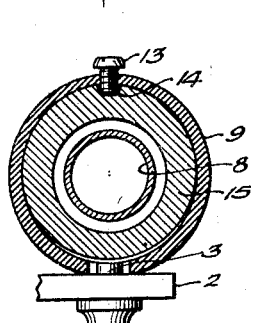
Figure 3 is a transverse sectional view through Figure 2 on line 3—3.

Referring to the accompanying drawing by numerals, 1 indicates a sextant of any desired kind, which sextant is provided with a bracket 2 of the usual construction, which bracket accommodates the threaded shaft 3, which shaft at one end is screwed into the telescope supporting ring 4 and the opposite end accommodates a clamping nut 5. The ring 4 is internally threaded so as to accommodate the threaded end 6 of the stationary section 7 of the telescope. The movable section 8 of the telescope slides freely back and forth in order that a proper focus may be secured. A sleeve 9 surrounds the ring 4 and is internally threaded, said ring having an inturned flange 10 fitted between the ring 4 and the shoulder 11 of section 7 when the section has been screwed properly into position as illustrated in Figure 2. The sleeve 9 is provided with a slot 12 to permit a proper adjustment in respect to the bracket 2 and is also supplied with a set screw 13 extending into the groove 14 of the tubular support 15, which tubular support is externally threaded and is screwed into the sleeve 9 any desired distance and is then locked in place by the set screw 13. The support 15 is provided with an annular smooth section 16 on which is mounted the annular section 17 of the rest 18, which rest is provided with a curved edge 19 adapted to engage the face around the eye when the device is in use.

The eyepiece 18 is integral with the annular section 17 which is rotatably mounted on the support 15 having a smooth section 16. Preferably the section 17 is loosely mounted on the section 15 and is at all times freely rotatable thereon whereby when the eyepiece is pressed tightly against the face, the sextant may be freely swung back and forth while the eyepiece remains stationary against the face.

Figure 1:
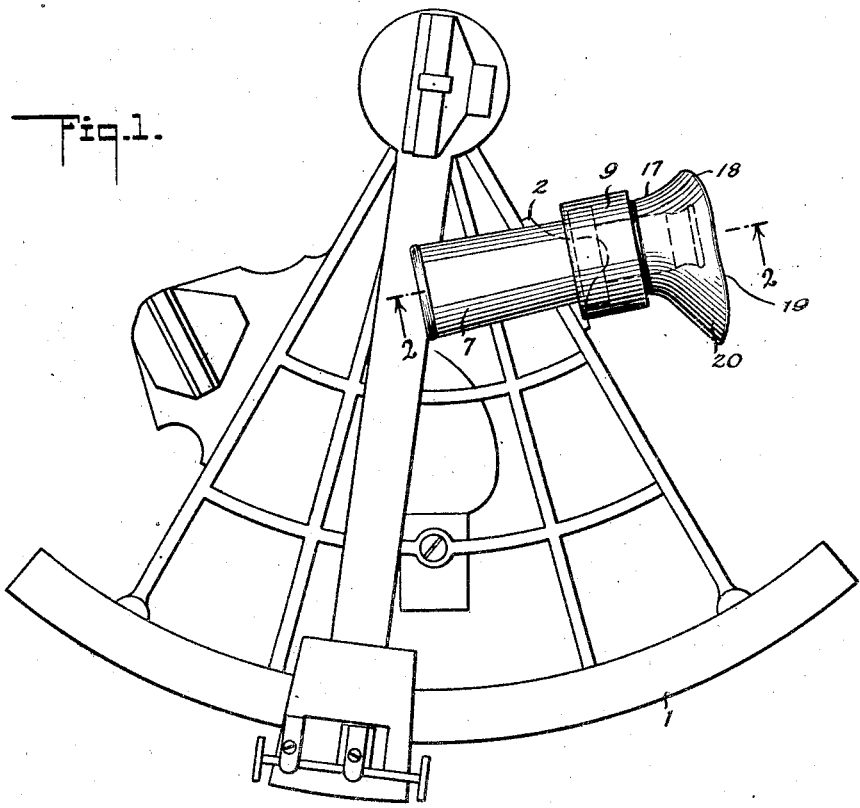
Figure 1 is a side view of a sextant with a telescope and rest disclosing an embodiment of the invention applied thereto.

From Figure 1 it will be observed that the rest 18 is also provided with a depending portion 20 merging into the section 17 whereby a flaring and larger opening is presented so that the edge 19 may properly press against the face while the eye is permitted to function in the usual manner.

In use, the sextant is held up in front of the eye and the rest or eyepiece 18 is pressed against the face in such a manner that the eye of the observer may look through the telescope. In order to ascertain whether or not the sextant is vertical, the observer swings the sextant in the arc of a circle with the center of the circle forming the axis of the telescope. As the observer swings the sextant he will note that the sun, stars or other point observed will have a low point and when the telescope is aimed at that low point, it indicates that the sextant is vertical and a proper angle may be secured, after which, the location of the ship may be worked out in the usual manner.

Heretofore, the telescope was held a short distance from the eye and, consequently, it was difficult to hold the instrument steady by reason of the rolling of the ship and the action of the wind. In addition to steadying the sextant by reason of bracing the same against the face, the rest or eyepiece 18 shuts out all the light from the eye except that passing through the telescope whereby it assists in this manner in securing a more accurate observation. By pressing the rest 18 against the face, part of the weight is also taken off the arm which again assists in permitting the observer to more steadily and accurately hold the instrument.

What I claim is:—

1. The combination with a sextant provided with a telescope, of an eyepiece mounted to freely rotate without changing the focus of the telescopes, said eyepiece being formed with an edge adapted to engage the face when the telescope is held adjacent the eye whereby part of the weight of the instrument is carried by the face of the observer.

2. In a sextant rest, a tubular supporting member connected to the telescope of the sextant, and a freely rotatable eyepiece mounted on said supporting member, said eyepiece being mounted to rotate without changing the focus of the telescope, said eyepiece being freely rotatable on the support whereby the eyepiece may be pressed against the face in operation and the sextant swung back and forth without shifting the eyepiece from the face or changing the focus of the telescope.

3. The combination with a sextant provided with a telescope, of an internally threaded sleeve connected with said telescope, a tubular support screwed into said sleeve, means for locking the tubular support in various positions, and an eyepiece rotatably mounted on said support.

4. The combination with a sextant provided with a telescope, of a sleeve mounted stationary in respect to the sextant, a tubular support mounted in the sleeve and adjustable therein, means for locking the tubular support in any adjusted position, said tubular support being provided with a reduced annular bearing, and an eyepiece formed with an annular ring section fitting onto said bearing and with a flaring portion formed with the edge adapted to engage the face of the observer when the sextant is in use.

FELIX WALTER KRETSCHMER.